Patented Oct. 22, 1946

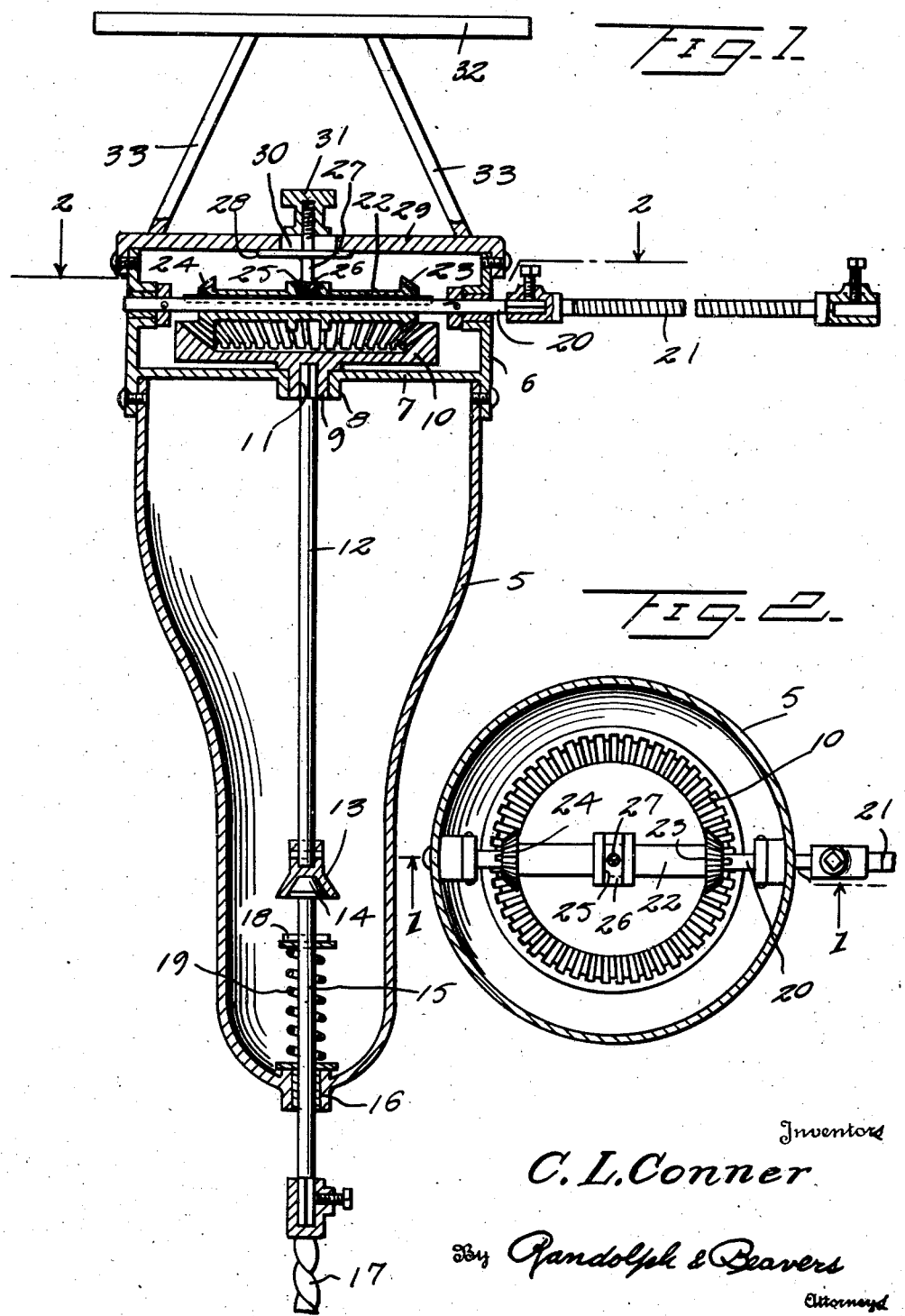

2,409,738

UNITED STATES PATENT OFFICE 2,409,738

REVERSING MECHANISM FOR POWER OPERATED DRILLS

Clarence L. Conner, McFarland, Calif.

Application January 19, 1945, Serial No. 573,497

2 Claims. (Cl. 74—378)

The present invention relates to new and useful improvements in power operated portable drills adapted primarily for utilizing the power take-off of a tractor as the source of power and the invention has for its primary object to provide a novel drive connection for the drill and including reversing means adapted to be secured in either its forward or reverse driving position.

A further object of invention is to provide a friction drive connection for the drill yieldably held in friction driving engagement whereby to prevent injury to the drill and its drive connection should the drill encounter obstructions in the drilling operation.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which Figure 1 is a vertical sectional view of the gear housing and shaft for the drill and Figure 2 is a sectional view taken substantially on a line 2—2 of Figure 1.

Referring now to the drawing in detail wherein for the purpose of illustration I have disclosed a preferred embodiment of the invention the numeral 5 designates a shaft housing to the upper portion of which is secured a gear housing 6 which serves to close the top of the shaft housing. The bottom 7 of the gear housing is formed with a bearing 8 in which the hub 9 of a ring gear 10 is journaled, the hub having a square shaped socket 11 in which the square shaped upper end of a shaft 12 is secured for rotation of the shaft upon the operation of the ring gear 10.

The lower end of the shaft 12 is formed with a conical socket 13 in which the conical head 14 of a lower shaft section 15 is frictionally engaged, the shaft section 15 being journaled in a bearing 16 at the bottom of the housing 5 and extending downwardly therefrom for attaching to the drill 17.

A pin 18 extends transversely of the upper portion of the shaft section 15 and a coil spring 19 is positioned between the pin and the bushing 16 to yieldably urge the friction head 14 into engagement with the socket 13 to provide a frictional drive connection between the shaft 12 and the shaft extension 15.

A horizontal shaft 20 is journaled in the opposite sides of the gear housing 6 and to one end of which is secured a flexible shaft 21 adapted for attaching to suitable power driven means, such as the power take-off of a tractor or the like (not shown).

A sleeve 22 is slidably keyed on the shaft 20 within the gear housing 6, the sleeve having gears 23 and 24, secured on the opposite ends thereof and adapted for selective engagement with diametrically opposite sides of the ring gear 10 whereby the engagement of one of said gears with the ring gear will produce a rotation of the drill 17 in one direction while the engagement of the other of said gears with the ring gear will rotate the drill in an opposite direction.

An annular groove 25 is formed intermediate the ends of the sleeve 22 and in which a semi-circular plate 26 is freely positioned, the plate having a stem 27 rising therefrom and provided with an annular flange 28 adapted for bearing against the underside of the cover plate 29 of the gear housing, the cover plate having a longitudinally extending opening 30 therein through which the stem projects into a position above the cover plate for threadedly receiving a clamping nut 31.

The releasing of the nut 31 will permit the stem 27 to slide transversely of the gear housing in the slot 30 whereby to cause the selective engagement of either the gear 23 or the gear 24 with the ring gear 10 and upon tightening the nut 31 the gears will be secured in either their engaged or neutral position.

A carrying handle 32 is attached to the cover plate 29 for the gear housing by means of the arms 33.

In the operation of the device the gear 20 is driven by a suitable source of power connected to the flexible shaft 21 and by sliding the sleeve 22 in either direction through the stem 27 and clamping nut 31 either of the gears 23 or 24 may be moved into engagement with the ring gear 10 to drive the drill 17 in a designated or desired direction. Should the drill encounter an obstruction during the drilling action the friction head 14 will slip in the friction socket 13 whereby to prevent injury to the mechanism.

It is believed the details of construction, manner of operation and advantages of the device will be readily understood from the foregoing without further detailed explanation.

While the foregoing specification sets forth the invention in specific terms, it is to be understood that numerous changes in the shape, size and materials may be resorted to without departing from the spirit and scope of the invention as claimed hereinafter.

Having thus described the invention, what I claim is:

1. In a power operated drill, a housing, a driven shaft journaled therein and having a ring gear keyed to one of its ends and disposed in the housing, a driving shaft journaled in the housing at a right angle to the driven shaft, a sleeve slidably keyed to the driving shaft and having bevel gears on the ends thereof spaced apart a distance less than the diameter of the toothed portion of the ring gear, said bevel gears being disposed for movement selectively into and out of meshing engagement with the ring gear, and actuating means rotatably connected to the sleeve and slidably connected to the housing for slidably moving the sleeve relatively to the driving shaft to move the bevel gears selectively into and out of meshing engagement with the ring gear.

2. A power operated drill as in claim 1, said actuating means including clamping means manually movable into and out of clamping engagement with the housing for retaining the sleeve and bevel gears in any of a plurality of positions with respect to the ring gear.

CLARENCE L. CONNER.